(12) United States Patent
Hashimura

(10) Patent No.: US 6,714,330 B2
(45) Date of Patent: Mar. 30, 2004

(54) SCANNING OPTICAL SYSTEM

(75) Inventor: Junji Hashimura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/104,065

(22) Filed: Mar. 25, 2002

(65) Prior Publication Data

US 2003/0072067 A1 Apr. 17, 2003

Related U.S. Application Data

(63) Continuation of application No. 09/527,568, filed on Mar. 16, 2000, now abandoned.

(30) Foreign Application Priority Data

Mar. 18, 1999 (JP) .......................................... 11-072910

(51) Int. Cl.$^7$ ............................................. G02B 26/08
(52) U.S. Cl. ...................... 359/204; 359/205; 359/214; 359/215
(58) Field of Search .................... 359/205, 212–219, 359/223, 226, 204; 347/241–244, 256–260, 232, 233, 243; 348/96–109

(56) References Cited

U.S. PATENT DOCUMENTS

| 4,547,038 A | * | 10/1985 | Mori |
| 5,633,736 A | * | 5/1997 | Griffith et al. ................ 359/17 |
| 6,014,262 A | * | 1/2000 | Noda ........................ 359/205 |
| 6,128,120 A | * | 10/2000 | Mushiake et al. .......... 359/221 |

* cited by examiner

*Primary Examiner*—James Phan
(74) *Attorney, Agent, or Firm*—Burns, Doane, Swecker & Mathis, LLP

(57) ABSTRACT

A scanning optical system has an object side lens unit for condensing light from an object, a mirror for performing a main scan to read the image of the object by deflecting the light transmitted through the object side lens and an image side lens unit for forming an image on the image sensing surface using both the extra-axial light and axial light in a subscan direction deflected by the mirror. The scanning optical system satisfies the predetermined condition defined by lenses of Abbe number.

10 Claims, 15 Drawing Sheets

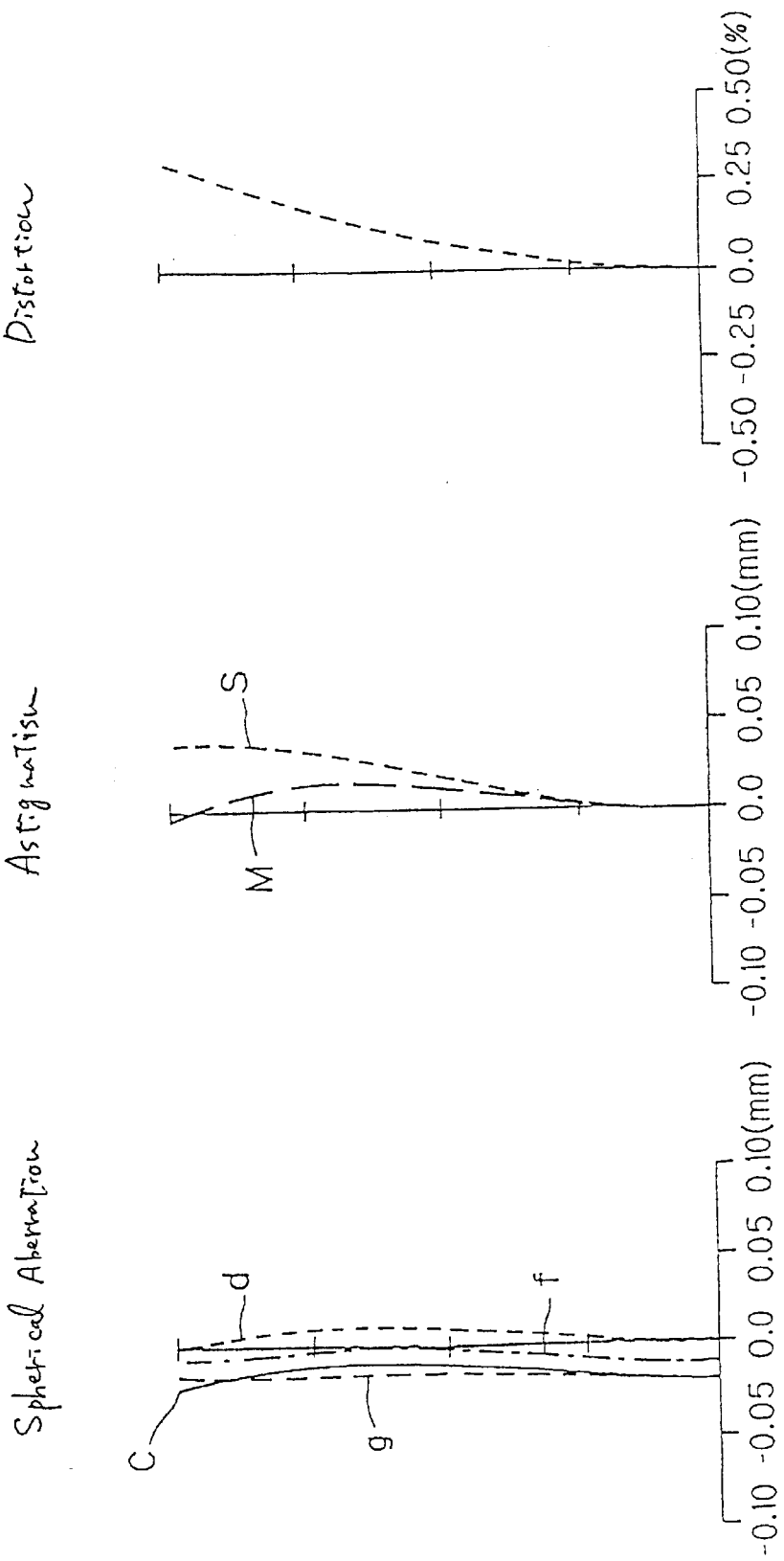

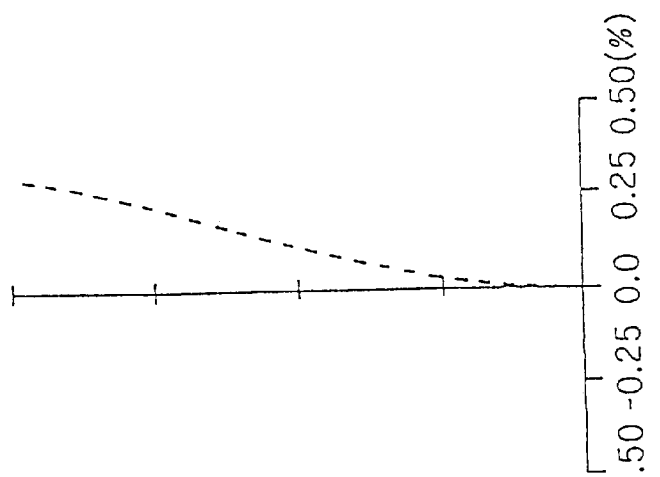
Fig. 14C Distortion
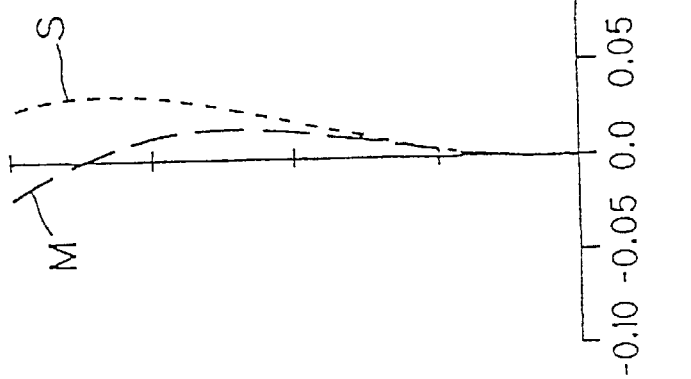
Fig. 14B Astigmatism
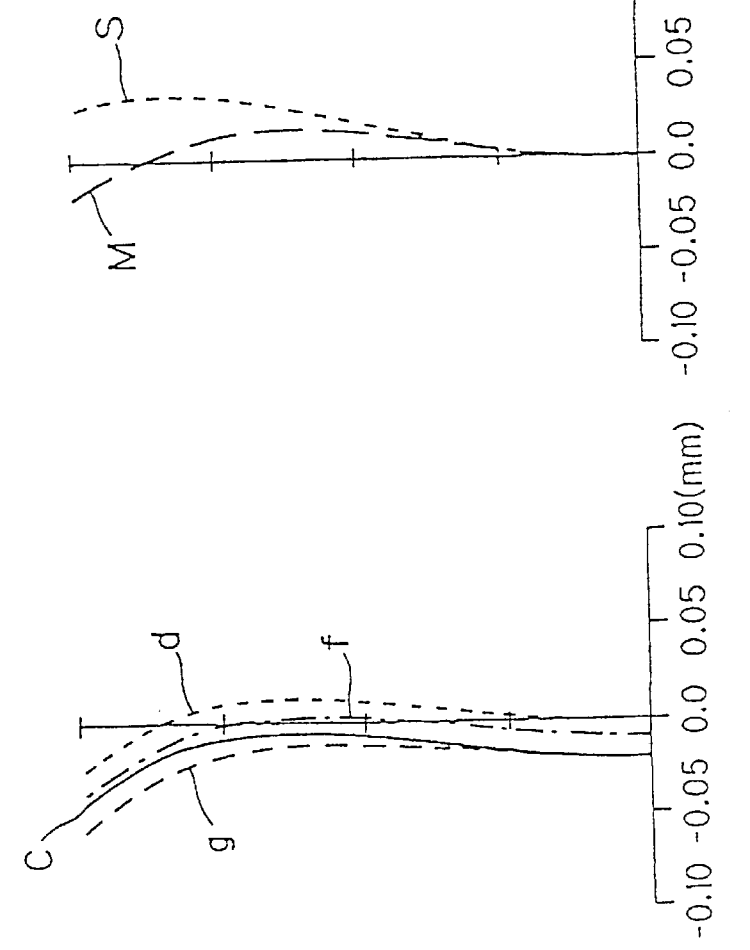
Fig. 14A Spherical Aberration

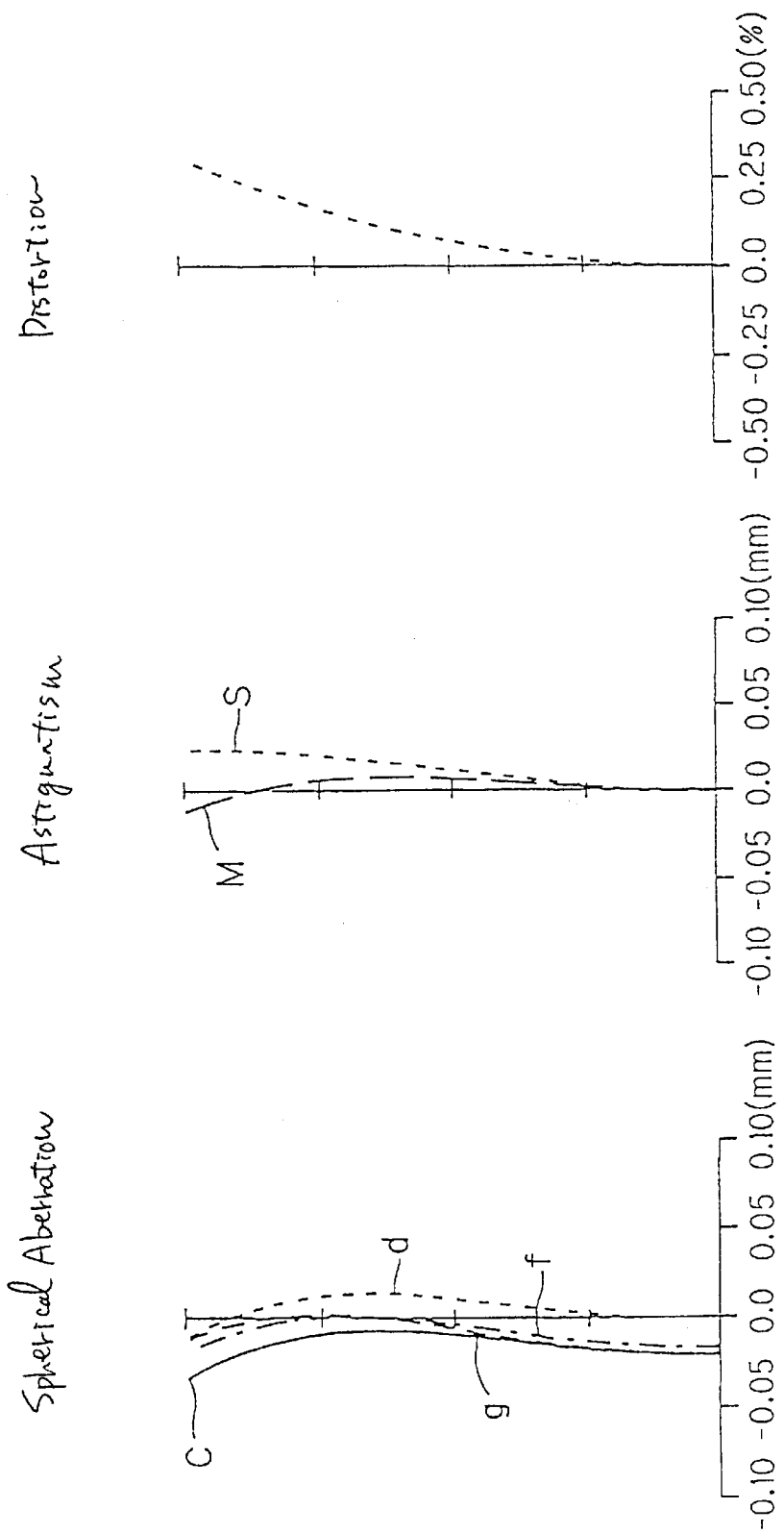

SCANNING OPTICAL SYSTEM

This application is a continuation of application Ser. No. 09/527,568, filed on Mar. 16, 2000 now abandoned.

CROSS-REFERENCE TO RELATED APPLICATIONS

This application is based on Patent Application No. 11-72910 filed in Japan, the content of which is hereby incorporated by reference.

BACKGROUND OF THE INVENTION

1. Field of the Invention

The present invention relates to a scanning optical system, for example a scanning optical system used in a film scanner or the like capable of high-speed image retrieval.

2. Description of the Related Art

Various scanning optical systems have been proposed for use in film scanners and the like. Among the proposed systems for high-speed, high-precision image retrieval is a scanning optical system for forming a film image on a unidimensional linear image sensing element (e.g., a line CCD) having an array of photoreceptor elements arranged in a subscan direction via a mirror rotated in a main scan direction to read an object. scanning optical systems suitable for this type of mirror scanning optical system have been disclosed in Japanese Laid-Open Patent Application Nos. 9-236741, 9-236747, 9-236766, and 9-236767.

The scanning optical systems disclosed in these patents use a color separation prism to accomplish so-called 3-panel color separation of color images, and therefore are disadvantageously expensive. Conventionally, in order to reduce cost while maintaining high resolution, it has been thought most effective to eliminate the color separation prism while using a tri-linear image sensing element having the aforesaid unidimensional line image sensing element arrayed in three lines in the main scan direction.

When the aforesaid tri-linear image sensing element is used, however, it becomes necessary not only to correct magnification chromatic aberration, but also axial chromatic aberration which is not a problem in optical systems using the color separation prism. That is, identical focusing is required on the three line image sensing elements on the same surface. When scanning via a mirror, severe disadvantages arise in the scanning optical system from the perspective of the various types of aberration generated, e.g., chromatic aberration, coma and the like.

SUMMARY OF THE INVENTION

In view of the previously mentioned disadvantages, an object of the present invention is to provide a high performance scanning optical system at low cost which specifically corrects magnification chromatic aberration and axial chromatic aberration without using a color separation prism, and is not susceptible to performance deterioration when scanning via a mirror.

These objects are attained by a scanning optical system having, an object side lens unit for condensing light from an object, a mirror for performing a main scan to read the image of the object by deflecting the light transmitted through the object side lens; and an image side lens unit for forming an image on the image sensing surface using both the axial light and extra-axial light in a subscan direction deflected by the mirror; and wherein the following condition is satisfied.

$$0.1 < |(\Sigma vfp - \Sigma vfm)/Lf| < 20.0$$

Where $\Sigma vfp$ represents the sum of the Abbe numbers of the positive optical power lenses within the object side lens unit, $\Sigma vfm$ represents the sum of the Abbe numbers of the negative optical power lenses within the object side lens unit, and Lf represents the number of lenses in the object side lens unit.

BRIEF DESCRIPTION OF THE DRAWINGS

These and other objects and features of this invention will become clear from the following description, taken in conjunction with the preferred embodiments with reference to the accompanying drawings, in which:

FIG. 11 is an aberration diagram of the first embodiment, FIG. 11A shows spherical aberration diagram, FIG. 11B shows astigmatism and FIG. 11C shows distortion;

FIG. 12 is an aberration diagram of the second embodiment, FIG. 12A shows spherical aberration diagram. FIG. 12B shows astigmatism and FIG. 12C shows distortion;

FIG. 13 is an aberration diagram of the third embodiment.

FIG. 14 is an aberration diagram of the fourth embodiment, FIG. 14A shows spherical aberration diagram, FIG. 14B shows astigmatism and FIG. 14C shows distortion; and FIG. 15 is an aberration diagram of the fifth embodiment, FIG. 15A shows spherical aberration diagram, FIG. 15B shows astigmatism and FIG. 15C shows distortion.

DETAILED DESCRIPTION OF THE PREFERRED EMBODIMENTS

Figure 1:
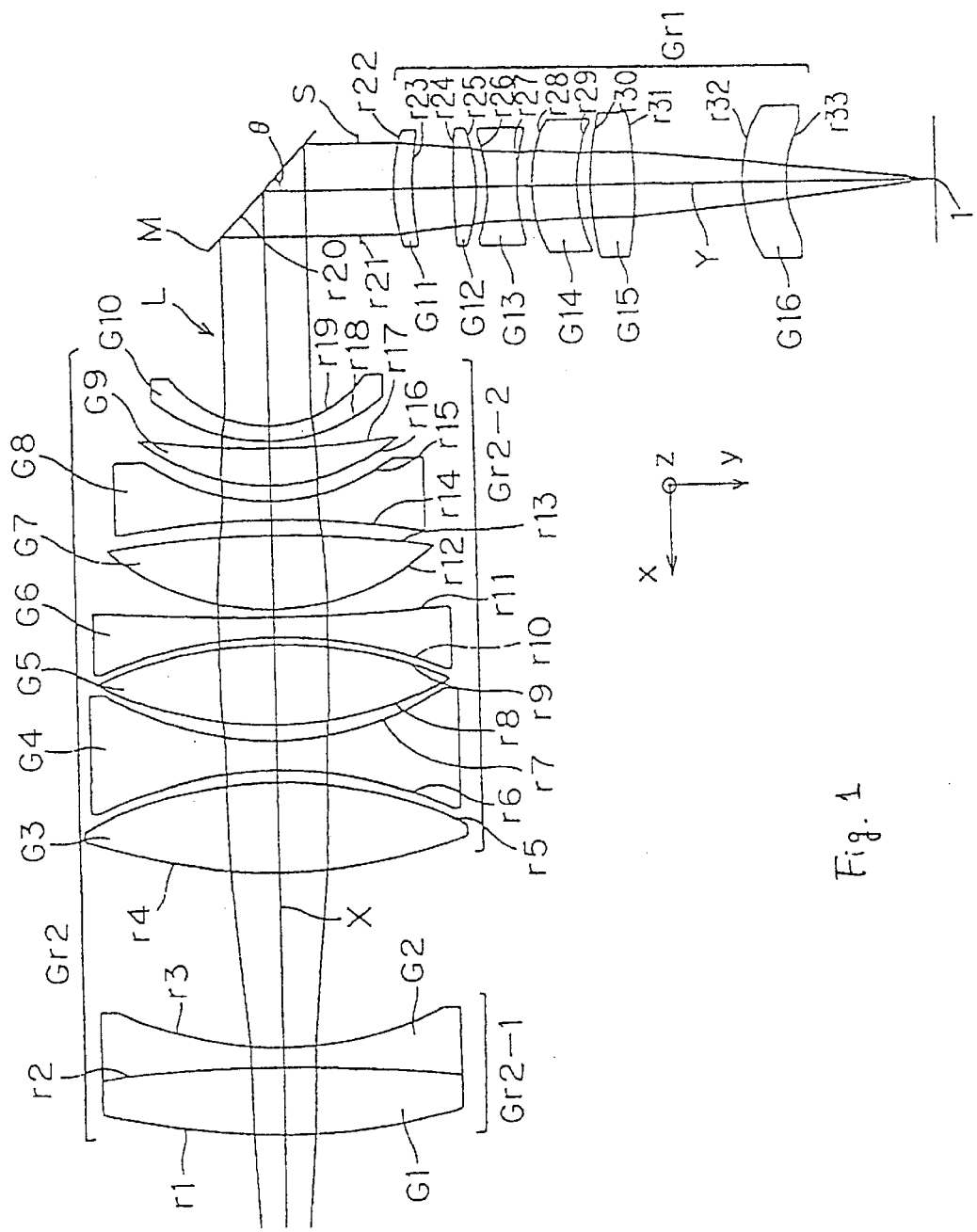
FIG. 1 is a construction of the scanning optical systems of the first embodiment (the angle $\theta=45°$)

The preferred embodiments of the present invention are described hereinafter with reference to the accompanying drawings. FIGS. 1 and 2, FIGS. 3 and 4, FIGS. 5 and 6, FIGS. 7 and 8, FIGS. 9 and 10 respectively show the constructions of the scanning optical systems of the first through fifth embodiments. In the drawings, the x-axis, y-axis, and z-axis are shown mutually perpendicular one to another: the drawing surface is designated the x-y plane, and the z-axis is perpendicular to the drawing surface toward the foot of the drawing. These scanning optical systems are of a mirror scanning type comprising sequentially from the image side an image side lens unit Gr1, stop S, mirror M, and object side lens unit Gr2.

A film screen not shown in the drawing is arranged as an object at a stationary position within the image sensing range on the object side of the scanning optical system, (i.e., the left side of lens unit Gr2 in each drawing), and a tri-linear image sensing element 1 is arranged as an image sensing surface on the image side of the scanning optical system, (i.e., the bottom side of the lens unit Gr1 in each drawing). The tri-linear image sensing element 1 is disposed with the z-axis direction (subscan direction) designated as the lengthwise direction, and the unidimensional line image sensing elements are arranged in three lines in the x-axis direction (main scan direction) (details not shown in the drawings).

The light from the film screen condensed by the object side lens unit Gr2 is deflected by the mirror M, and the axial light and extra-axial light in the subscan direction both form an image on the tri-linear image forming element 1 via the image side lens unit Gr1. The image side lens unit Gr1 and the object side lens unit Gr2 comprise rotationally symmetrical spherical surface lenses, and have a symmetrical type construction advantageous in aberration correction via the mirror M.

FIGS. 1, 3, 5, 7, and 9 show the optical path L at a rotational angle relative to the Y-axis of the mirror M, i.e., the mirror oscillation angle, of $\theta=45°$. The angle range of $\theta=45°\pm6.1°$ centered on the mirror oscillation angle of $\theta=45°$ becomes the main scanning range. FIGS. 2, 4, 6, 8, and 10 show the optical path La at a mirror oscillation angle of $\theta=45°-6.1°$. The angle range of $\theta=45°\pm6.1°$ centered on the mirror oscillation angle of $\theta=45°$ becomes the main scanning range. Although the optical path has been omitted at $\theta=45°+6.1°$, the optical path through the object side lens unit Gr2 at this time is approximately symmetrical to the optical axis X in FIGS. 1, 3, 5, 7, 9 relative to the optical path shown in FIGS. 2, 4, 6, 8, 10.

Figure 2:
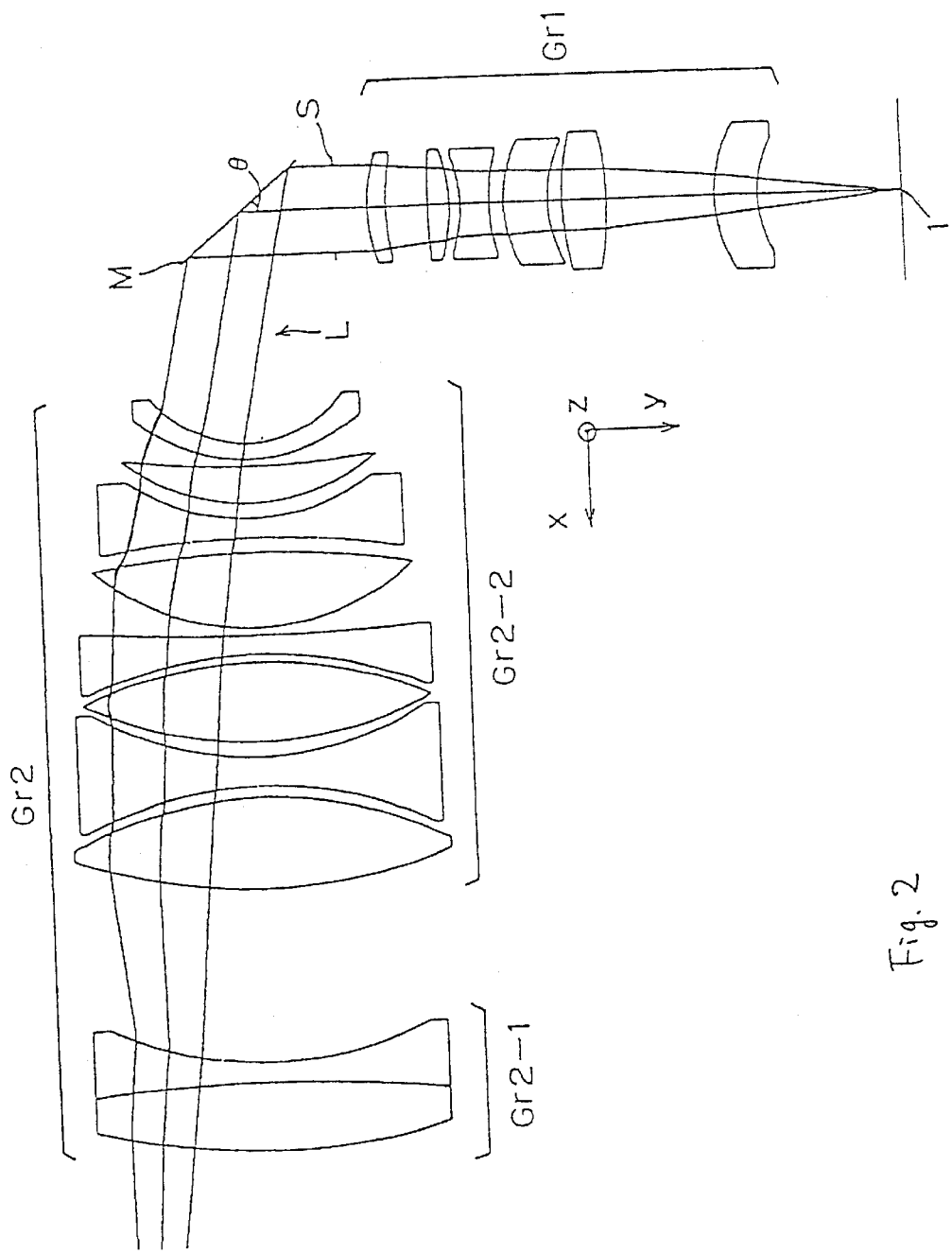
FIG. 2 is a construction of the scanning optical systems of the first embodiment (the angle $\theta=45°-6.1°$)

In the first embodiment shown in FIGS. 1 and 2, the object side lens unit Gr2 comprises sequentially from the object side ten lens elements G1~G10 along the optical axis X, and the image side lens unit Gr1 comprises sequentially from the object side six lens elements G11~G16 along the optical axis Y. The object side lens unit Gr2 can be understood as comprising sequentially from the object side an object side front lens unit Gr2-1 and an object side back lens unit Gr2-2 arranged with a relatively large spacing therebetween. The object side front lens unit Gr2-1 is a cemented lens comprising two lens elements G1 and G2, and the object side back lens unit Gr2-2 comprises eight lens elements G3~G10.

Figure 3:
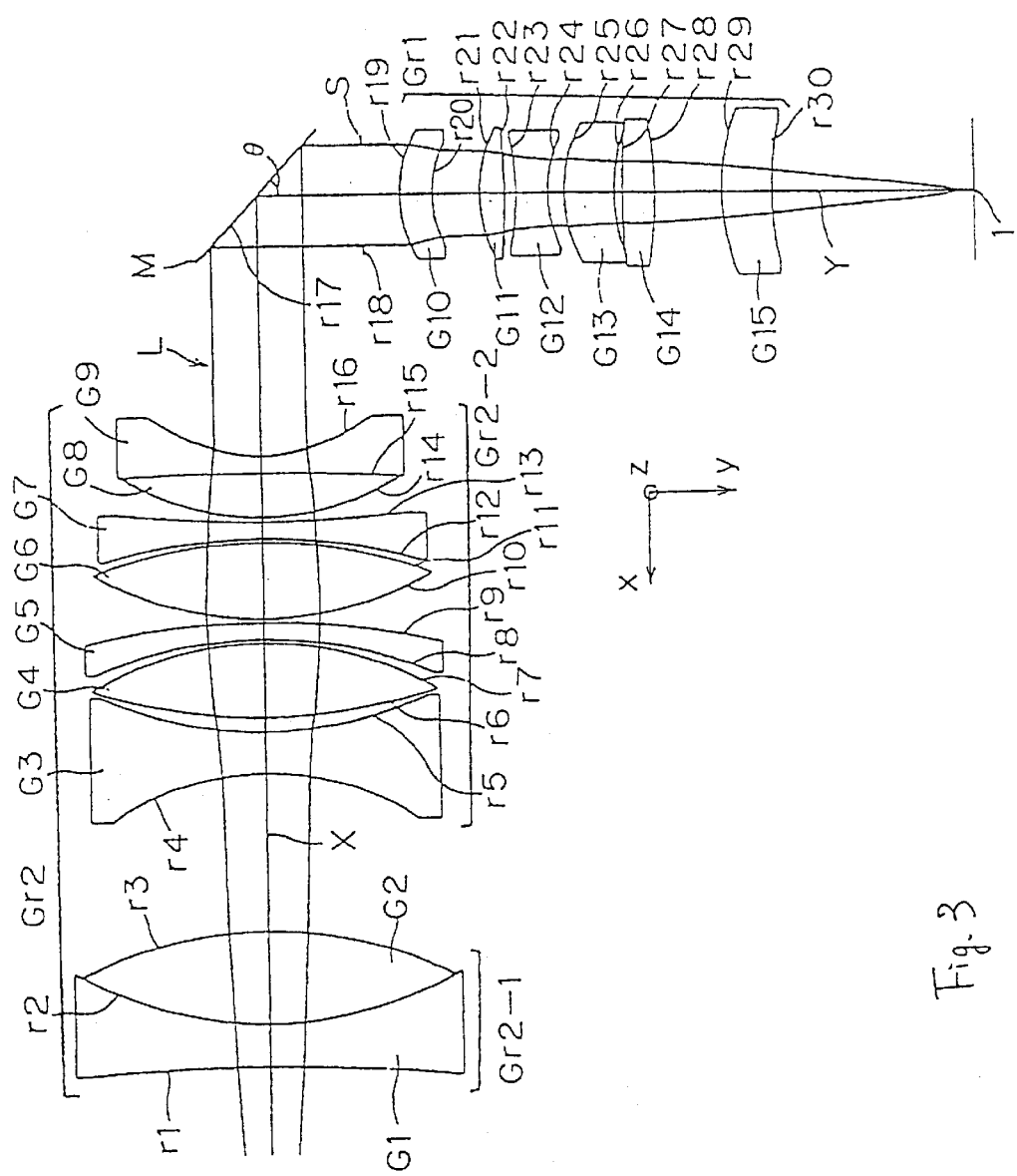
FIG. 3 is a construction of the scanning optical systems of the second embodiment (the angle $\theta=45°$)
Figure 4:
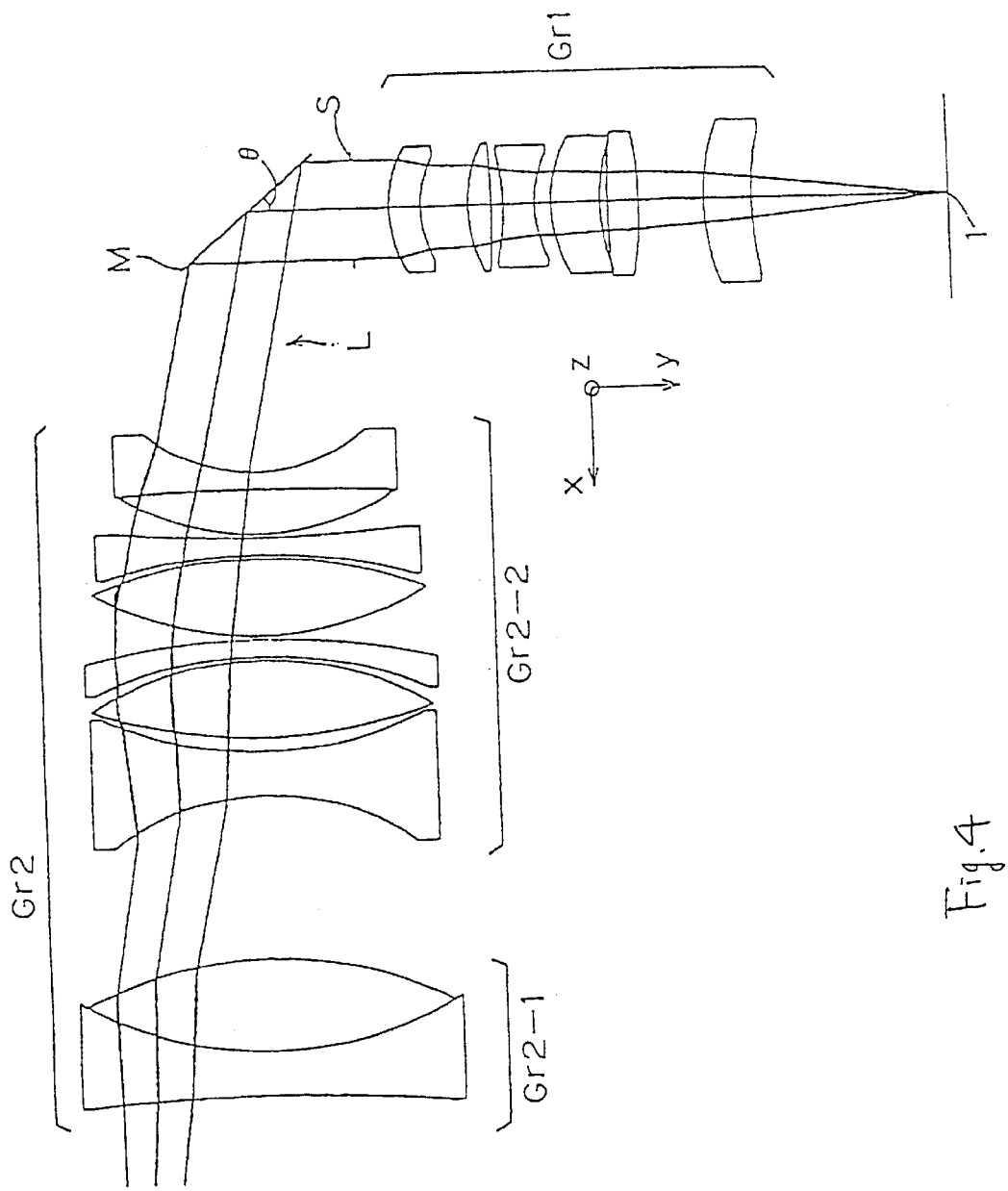
FIG. 4 is a construction of the scanning optical systems of the second embodiment (the angle $\theta=45°-6.1°$)

In the second embodiment shown in FIGS. 3 and 4, the object side lens unit Gr2 comprises sequentially from the object side nine lens elements G1~G9 along the optical axis X, and the image side lens unit Gr1 comprises sequentially from the object side six lens elements G10~G15 along the optical axis Y. The object side lens unit Gr2 can be understood as comprising sequentially from the object side an object side front lens unit Gr2-1 and an object side back lens unit Gr2-2 arranged with a relatively large spacing therebetween. The object side front lens unit Gr2-1 is a cemented lens comprising two lens elements G1 and G2, and the object side back lens unit Gr2-2 comprises seven lens elements G3~G9.

Figure 5:
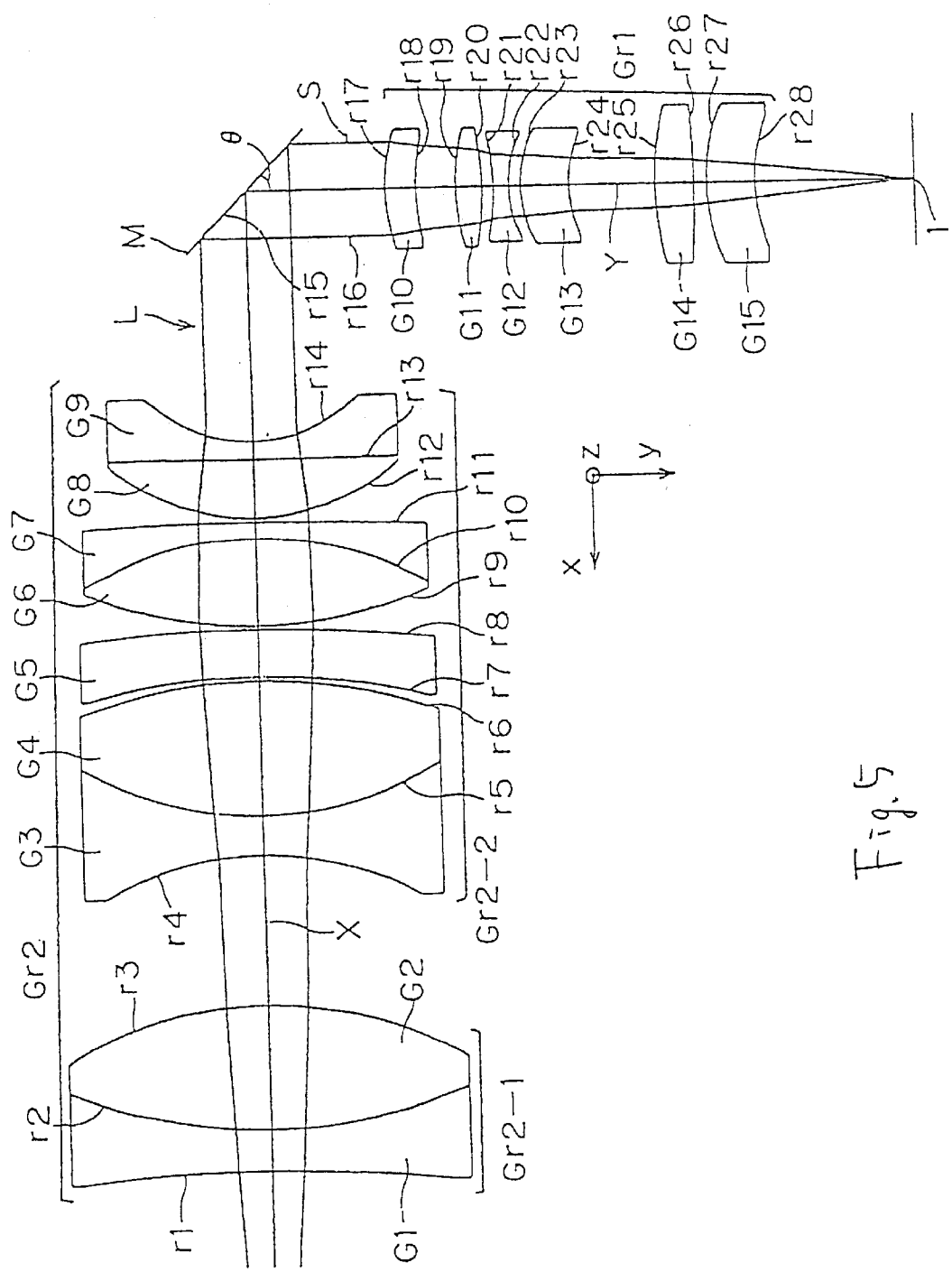
FIG. 5 is a construction of the scanning optical systems of the third embodiment (the angle $\theta=45°$)
Figure 6:
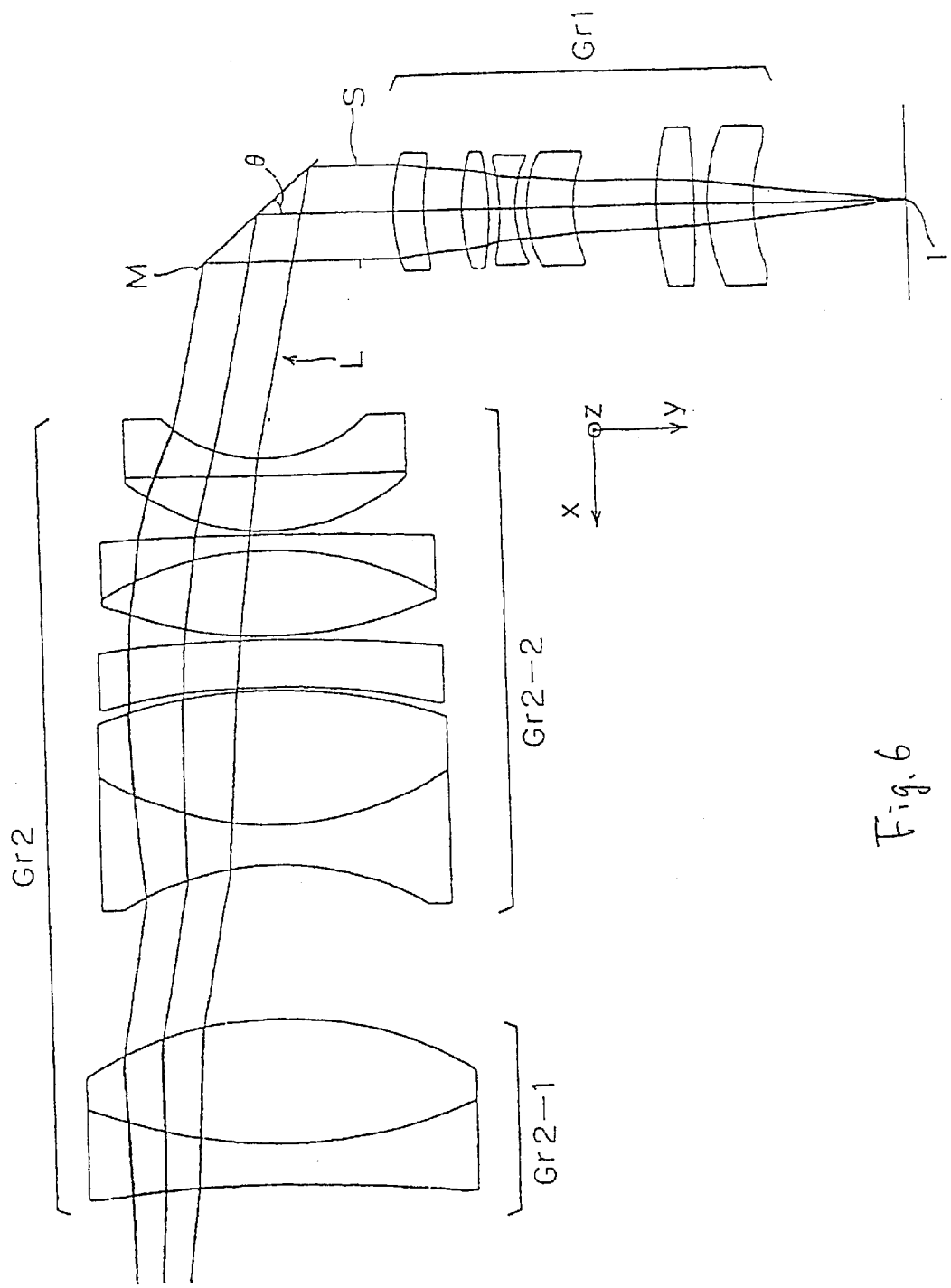
FIG. 6 is a construction of the scanning optical systems of the third embodiment (the angle $\theta=45°-6.1°$)

In the third embodiment shown in FIGS. 5 and 6, the object side lens unit Gr2 comprises sequentially from the object side nine lens elements G1~G9 along the optical axis X, and the image side lens unit Gr1 comprises sequentially from the object side six lens elements G10~G15 along the optical axis Y. The object side lens unit Gr2 can be understood as comprising sequentially from the object side an object side front lens unit Gr2-1 and an object side back lens unit Gr2-2 arranged with a relatively large spacing therebetween. The object side front lens unit Gr2-1 is a cemented lens comprising two lens elements G1 and G2, and the object side back lens unit Gr2-2 comprises seven lens elements G3~G9.

Figure 7:
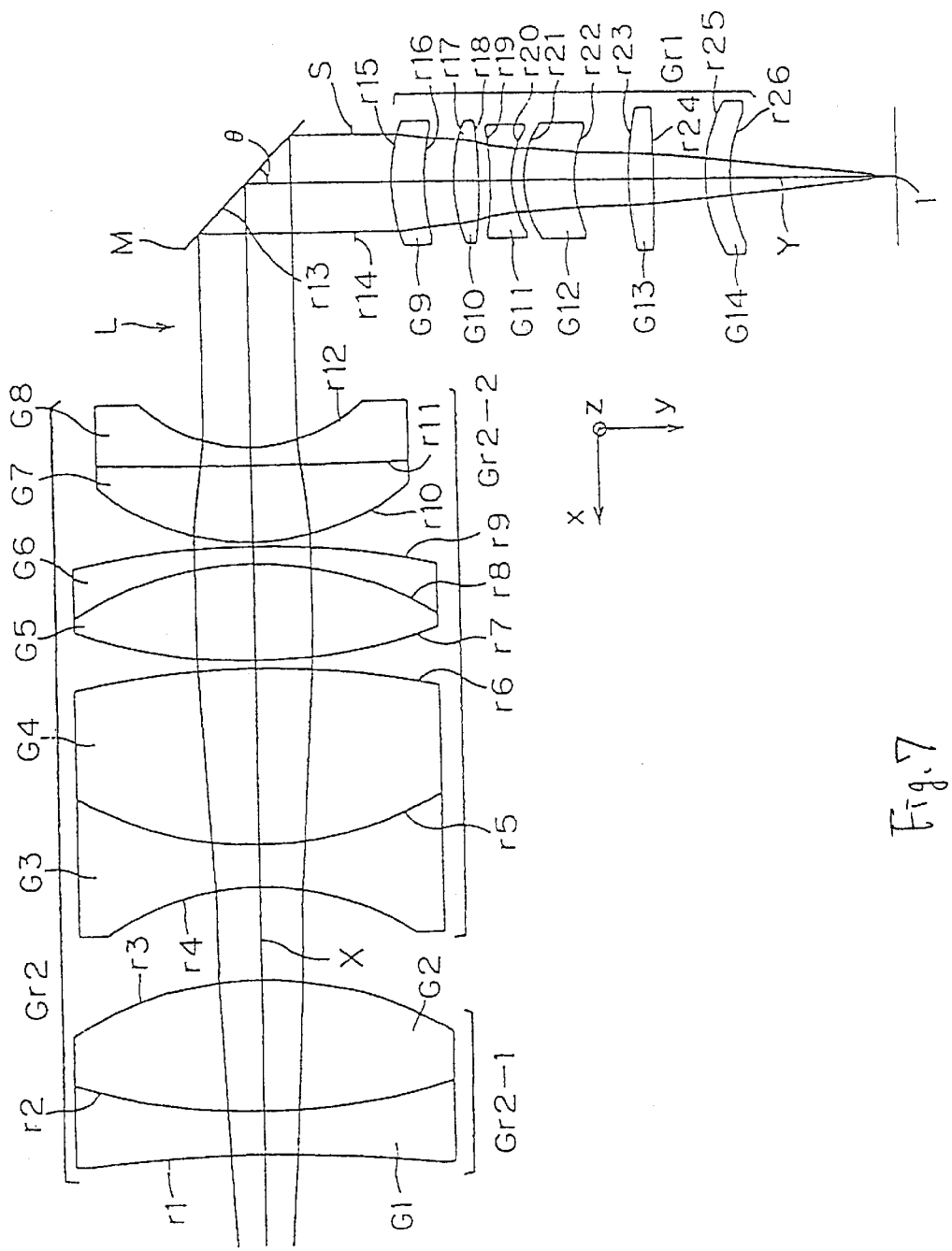
FIG. 7 is a construction of the scanning optical systems of the fourth embodiment (the angle $\theta=45°$)
Figure 8:
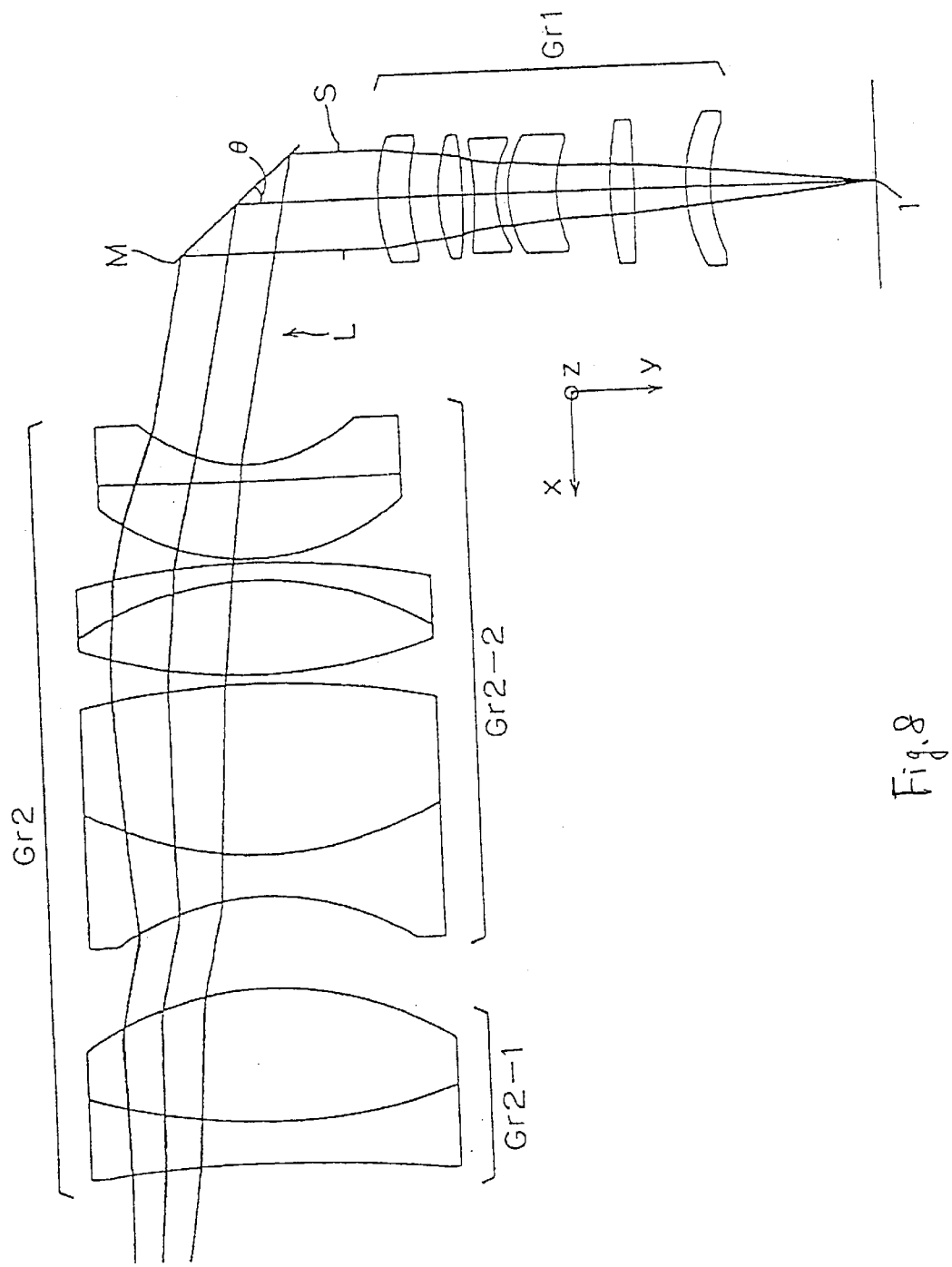
FIG. 8 is a construction of the scanning optical systems of the fourth embodiment (the angle $\theta=45°-6.1°$)

In the fourth embodiment shown in FIGS. 7 and 8, the object side lens unit Gr2 comprises sequentially from the object side eight lens elements G1~G8 along the optical axis X, and the image side lens unit Gr1 comprises sequentially from the object side six lens elements G9~G14 along the optical axis Y. The object side lens unit Gr2 can be understood as comprising sequentially from the object side an object side front lens unit Gr2-1 and an object side back lens unit Gr2-2 arranged with a relatively large spacing therebetween. The object side front lens unit Gr2-1 is a cemented lens comprising two lens elements G1 and G2, and the object side back lens unit Gr2-2 comprises six lens elements G3~G8.

Figure 9:
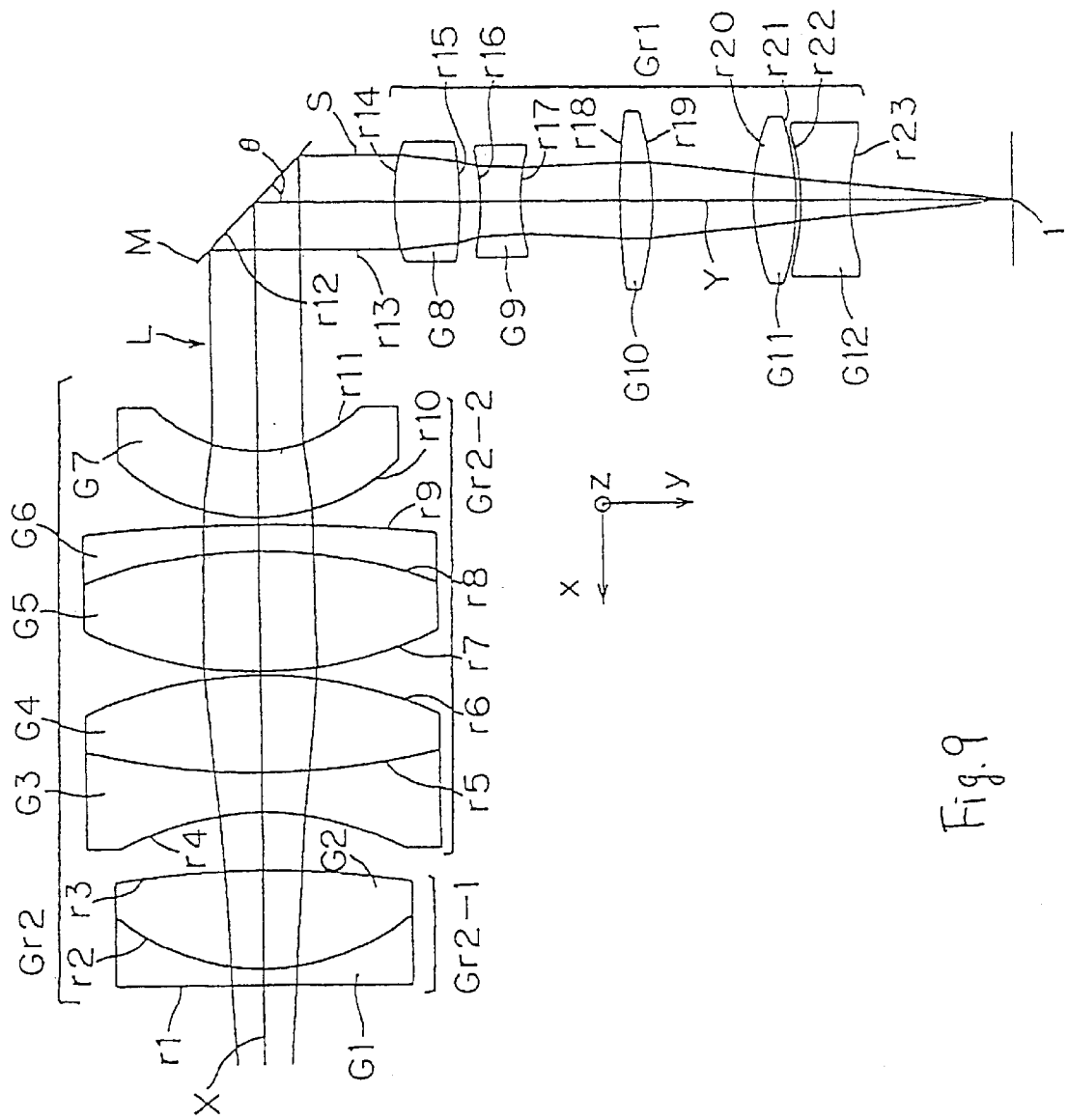
FIG. 9 is a construction of the scanning optical systems of the fifth embodiment (the angle $\theta=45°$)
Figure 10:
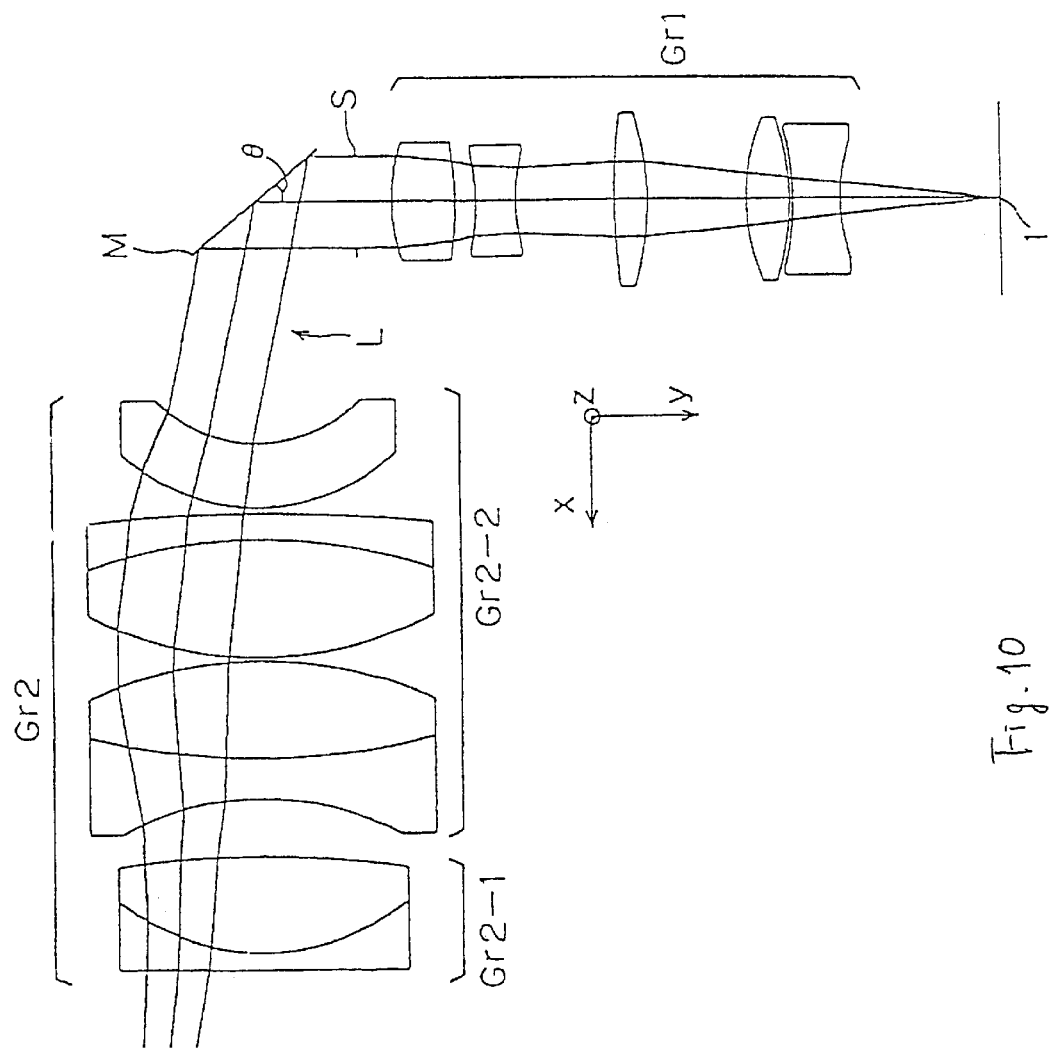
FIG. 10 is a construction of the scanning optical systems of the fifth embodiment (the angle $\theta 32\ 45°-6.1°$)
Figures 12A, 12B, 13C:
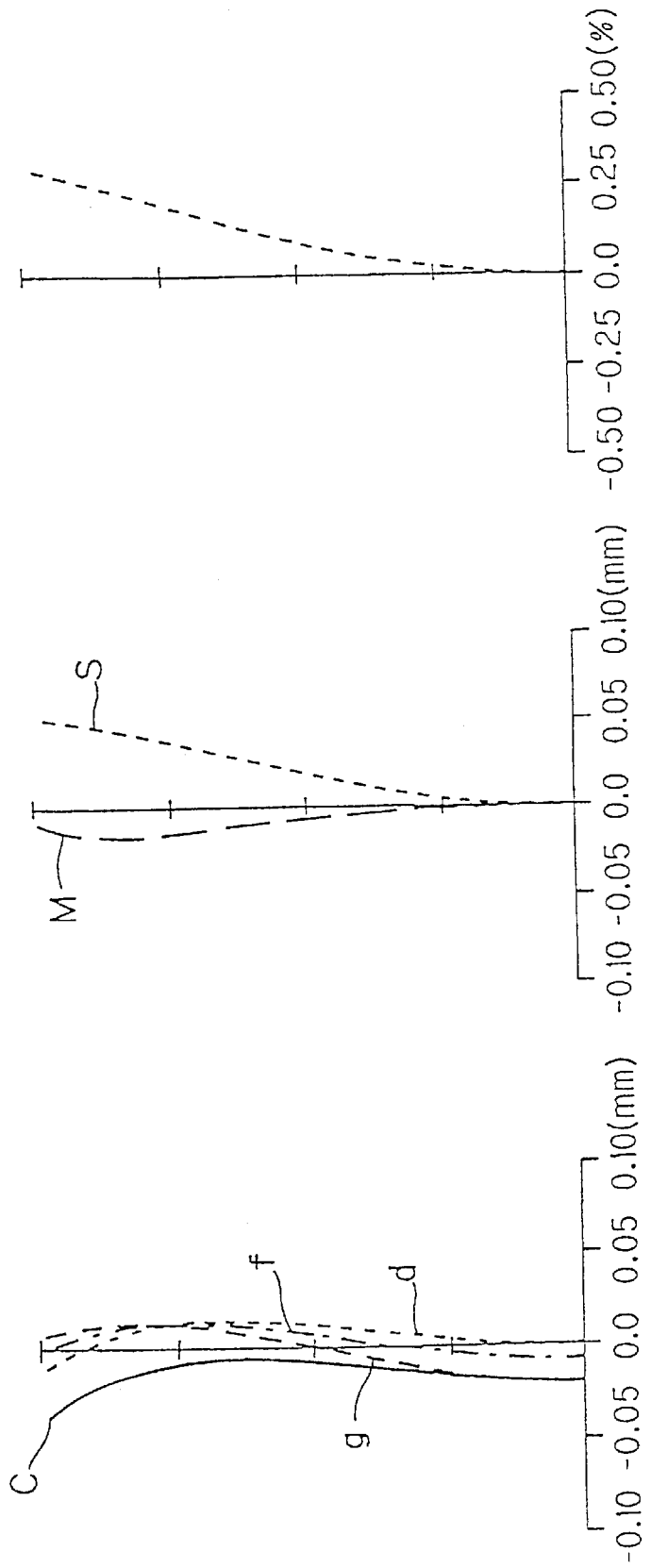
Figure 13C:
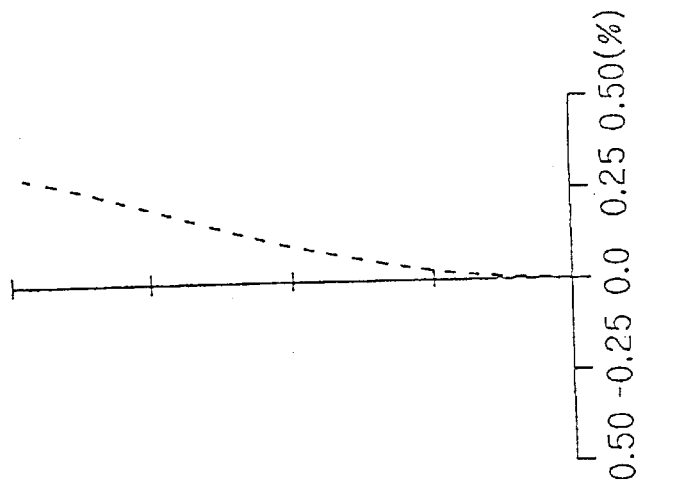
FIG. 13B shows astigmatism and FIG. 13C shows distortion.
Figure 13B:
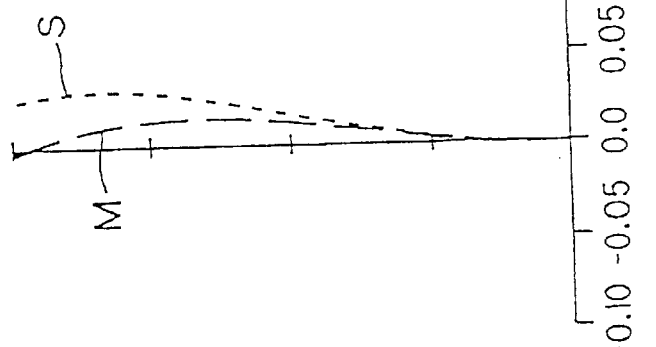
Figure 13A:
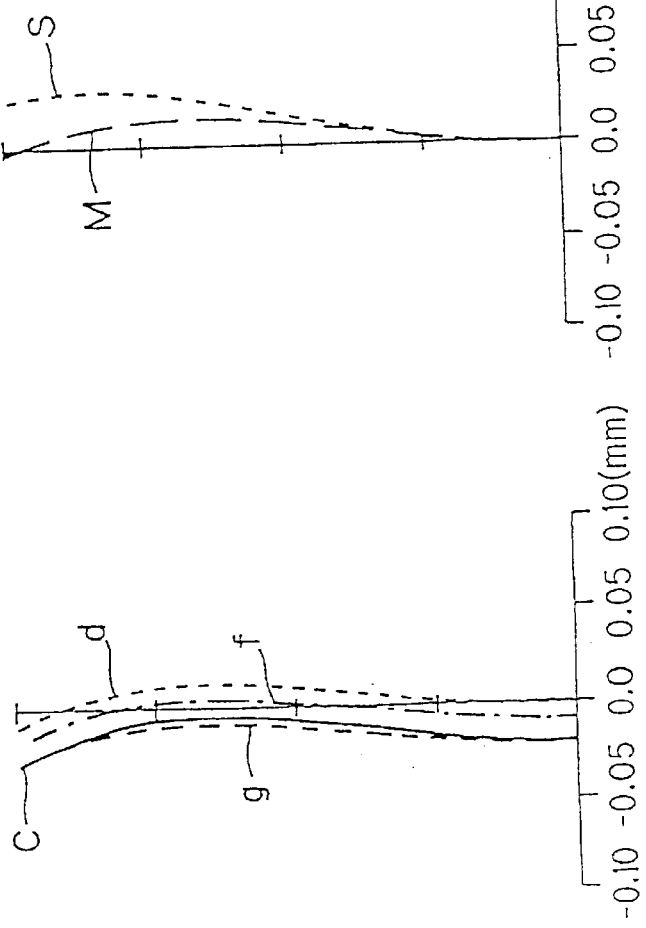
FIG. 13A shows spherical aberration diagram.

In the fifth embodiment shown in FIGS. 9 and 10, the object side lens unit Gr2 comprises sequentially from the object side seven lens elements G1~G7 along the optical axis X, and the image side lens unit Gr1 comprises sequentially from the object side five lens elements G8~G2 along the optical axis Y. The object side lens unit Gr2 can be understood as comprising sequentially from the object side an object side front lens unit Gr2-1 and an object side back lens unit Gr2-2 arranged with a relatively large spacing therebetween. The object side front lens unit Gr2-1 is a cemented lens comprising two lens elements G1 and G2, and the object side back lens unit Gr2-2 comprises five lens elements G3~G7.

Desirable conditions for the scanning optical system are described below. In scanning optical systems comprising an object side lens unit for condensing light from an object, a mirror for performing a main scan to read the image of the object by deflecting the light transmitted through the object side lens, and an image side lens unit for forming an image on the image sensing surface using both the extra-axial light and axial light in a subscan direction deflected by the mirror, such as in the previously described embodiments, magnification chromatic aberration is generated by mirror scanning. In order to reduce this chromatic aberration, the chromatic aberration of each lens unit must be preset at a desirable state. Furthermore, it is desirable to accomplish aberration correction by negating each aberration via the respective lens units by correcting the aberration generated by the object side lens unit via the image side lens unit.

In the scanning optical systems of the above mentioned embodiments, it is desirable that the object side lens unit satisfies condition (1) below. When the following condition is satisfied, excellent chromatic aberration correction can be achieved, and a high-performance optical system can be realized:

$$0.1<|(\Sigma vfp-\Sigma vfm)/Lf|<20.0 \quad (1)$$

where $\Sigma vfp$ represents the sum of the Abbe numbers of the positive optical power lenses within the object side lens unit, $\Sigma vfm$ represents the sum of the Abbe numbers of the negative optical power lenses within the object side lens unit, and Lf represents the number of lenses in the object side lens unit.

Chromatic aberration generated within the object side lens unit can be reduced, and particularly a reduction of axial chromatic aberration is achieved in the complete optical system by satisfying the above conditions. When the upper limit of condition (1) is exceeded, chromatic aberration generated by the positive optical power lens elements within the object side lens unit is particularly increased, so as to make it difficult to correct the chromatic aberration generated by the object side lens unit via the image side lens unit. Conversely, when the lower limit of condition (1) is exceeded, chromatic aberration generated by the negative optical power lens elements within the object side lens unit is particularly increased, so as to make it difficult to correct the chromatic aberration generated by the object side lens unit via the image side lens unit.

In the scanning optical systems of each of the previously mentioned embodiments, it is desirable that the image side lens unit satisfies condition (2) below:

$$10.0 < |(\Sigma vrp - \Sigma vrm)/Lr| < 50.0 \qquad (2)$$

where $\Sigma vrp$ represents the sum of the Abbe numbers of the positive optical power lenses within the image side lens unit, $\Sigma vrm$ represents the sum of the Abbe numbers of the negative optical power lenses within the image side lens unit, and Lr represents the number of lenses in the image side lens unit.

Chromatic aberration generated by the object side lens unit can be corrected by the image side lens unit, and a high-performance optical system can be realized by satisfying the above condition. When the upper limit of condition (2) is exceeded, chromatic aberration generated by the positive optical power lens elements within the image side lens unit is particularly increased, so as to make it difficult to correct the chromatic aberration generated by the object side lens unit via the image side lens unit. Conversely, when the lower limit of condition (2) is exceeded, chromatic aberration generated by the negative optical power lens elements within the image side lens unit is particularly increased, so as to make it difficult to correct the chromatic aberration generated by the object side lens unit via the image side lens unit.

Although it is desirable to correct the chromatic aberration of the total optical system by correcting the chromatic aberration generated by the object side lens unit via the image side lens unit, if the chromatic aberration of each lens unit is becomes too large, an undesirable effect is that magnification chromatic aberration becomes particularly large when scanning via a mirror. In correspondence therewith, the previously mentioned conditions aim not only to reduce axial chromatic aberration, but also to reduce magnification chromatic aberration generated during mirror scanning.

In the scanning optical systems of each of the previously mentioned embodiments, it is desirable that the cemented lens comprises a negative lens element and a positive lens element on the outermost object side. In this way, it is possible to achieve excellent correction of magnification chromatic aberration, particularly extra-axial magnification chromatic aberration. It is further desirable that the cemented lens on the outermost object side within the object side lens unit satisfies condition (3) below:

$$|(\phi f - 1)/\phi f| < 1.0 \qquad (3)$$

where $\phi f - 1$ represents the optical power of the cemented lens on the outermost object side within the object side lens unit, and $\phi f$ represents the optical power of the object side lens unit.

Condition (3) is a condition for correcting chromatic aberration, and particularly extra-axial aberration, via the cemented lens on the outermost object side within the object side lens unit. When the upper limit of condition (3) is exceeded, it becomes difficult to correct the various types of aberration such as magnification chromatic aberration and extra-axial aberration generated by the lens elements.

In the scanning optical systems of each of the aforementioned embodiments, it is desirable that the object side lens unit comprises sequentially from the object side an object side front lens unit and an object side back lens unit disposed with a relatively large space therebetween. In this way, a difference is created in the ray height of the paraxial marginal ray between the outermost image side lens element of the object side front lens unit and the outermost object side lens element of the object side back lens unit, which is greatly effective in correcting the extra-axial aberration in particular.

It is desirable that the outermost image side lens element within the object side front lens unit and the outermost object side lens element within the object side back lens unit satisfy condition (4) below:

$$0.4 < (Rf-1r)/(Rf-2f) < 5.0 \qquad (4)$$

where $Rf-1r$ represents the radius of curvature of the image side surface of the outermost image side lens element within the object side front lens unit, and $Rf-2f$ represents the radius of curvature of the object side surface of the outermost object side lens element within the object side back lens unit.

Condition (4) is a condition for correcting various types of aberration, most importantly spherical aberration and extra-axial coma generated within the lens unit of the object side lens unit, and is a condition particularly for balancing the aberration generated by over-correction by the object side front lens unit by means of the image side lens element. When this condition is eliminated, the balance of aberration correction is adversely affected within the object side lens element, resulting in insufficient correction or over-correction of aberration, and undesirably generating high order aberration in particular.

It is desirable that the object side lens unit satisfies condition (5) below:

$$0.05 < (Tf-12) \times \phi f < 0.4 \qquad (5)$$

where $Tf-12$ represents the distance between the object side front lens unit and the object side back lens unit, and $\phi f$ represents the optical power of the object side lens unit.

Condition (5) relates to the spacing between the object side front lens unit and the object side back lens unit, and from aberration theory is greatly effective in correcting the extra-axial aberration in particular by creating a difference in the ray height of the paraxial marginal ray between the object side front lens unit and the object side back lens unit. When the lower limit of condition (5) is exceeded, sufficient difference in ray height of the paraxial marginal ray cannot be obtained. Conversely, when the upper limit is exceeded, the total length of the object side lens unit is increased, so as to undesirably increase the space required by the optical system.

In the scanning optical system of the previously mentioned embodiments, it is desirable that the exit pupil of the object side lens unit approximately matches the entrance pupil of the image side lens unit. For this reason, it is desirable to provide a common stop for both the object side lens unit and the image side lens unit near the mirror used for scanning.

The object side lens unit desirably possesses at least one negative lens element for chromatic aberration correction, spherical aberration correction, and Petzval sum correction. In this way, the height of the pass-through ray is increased so as to effectively correct spherical aberration. Furthermore, the height of the extra-axial light passing through the lens is also increased, which is advantageous in correcting extra-axial aberration.

It is desirable that the extra-axial luminous flux heightened at the lens passage position nearly matches the passage position near the stop position, and to achieve this end, it is desirable that the outermost image side lens element within the object side lens unit has a concave surface on the image side, and it is particularly desirable that this lens element having a concave meniscus shape on the image side. In this way, extra-axial aperture efficiency is maintained, and mirror used for the main scan can be made more compact.

It is desirable that the negative lens of the image side lens unit satisfies condition (6) below:

$$vrm < 35.0 \quad (6)$$

where vrm represents the Abbe number of the negative lens in the image side lens unit. Condition (6) is a condition for obtaining a desired chromatic aberration generated within the image side lens unit. When the range of condition (6) is omitted, it becomes difficult to correct the aberration generated by the positive lens element within the image side lens unit via the negative lens element.

When considering aberration correction of the entire optical system, it is necessary to balance the respective aberrations generated by the object side lens unit and the image side lens unit. Although it is desirable that the negative lens element in the object side lens unit have a relatively large optical power to correct chromatic aberration, spherical aberration, and extra-axial aberration, the large optical power generates negative aberration. In order to correct this aberration in the negative direction, it is desirable that the surface of the outermost object side lens element within the image side lens unit is a positive lens element having a convex shape on the object side. In this way, the pass-through position of the extra-axial luminous flux from the object side lens unit can be reduced in the lens element following the image side lens unit, so as to have a more compact lens diameter.

It is further desirable that the surface of the lens element on the outermost image side in the image side lens unit is a concave surface on the image side. In this way, extra-axial aberration, and particularly distortion, can be corrected in a desired direction.

The construction of the photographic optical system of the present invention is described below by way of specific examples of construction data and aberration diagrams. The optical systems of examples 1~5 respectively correspond to the optical systems of the first through fifth embodiments. The structural diagrams (FIGS. 1 and 2, FIGS. 3 and 4, FIGS. 5 and 6, FIGS. 7 and 8, FIGS. 9 and 10) representing the scanning optical systems of the first through fifth embodiments respectively show the construction of the corresponding optical systems of examples 1~5.

In each example, ri (i=1, 2, 3 . . . ) represents the No. i surface and the radius of curvature of the No. i surface counting from the object side, di (i=1, 2, 3 . . . ) represents the axial distance of the No. i surface counting from the object side, Gi (i=1, 2, 3 . . . ) represents the No. i lens element counting from the object side, Ni (i=1, 2, 3) and vi (i=1, 2, 3 . . . ) respectively represent the d-line refractive index and Abbe number of the No. i lens element counting from the object side.

EXAMPLE 1

| Object distance: | 60 mm |
| Effective F. No.: | 5.0 |
| Mirror oscillation angle: | ±6.1 degrees |

| [Radius of Curvature] | [Axial Distance] | [Lens] | [Refractive Index] | [Abbe Number] |
|---|---|---|---|---|
| r1 = 91.255 | d1 = 9.00 | G1 | N1 = 1.75450 | v1 = 51.57 |
| r2 = −197.911 | d2 = 2.50 | G2 | N2 = 1.67339 | v2 = 29.25 |
| r3 = 49.624 | d3 = 22.89 | | | |
| r4 = 73.094 | d4 = 12.00 | G3 | N3 = 1.61800 | v3 = 63.39 |
| r5 = −56.042 | d5 = 1.50 | | | |
| r6 = −53.916 | d6 = 4.00 | G4 | N4 = 1.67339 | v4 = 29.25 |
| r7 = 43.252 | d7 = 2.00 | | | |
| r8 = 52.205 | d8 = 10.49 | G5 | N5 = 1.83350 | v5 = 21.00 |
| r9 = −59.216 | d9 = 1.00 | | | |
| r10 = −59.339 | d10 = 2.50 | G6 | N6 = 1.67339 | v6 = 29.25 |
| r11 = 295.777 | d11 = 1.00 | | | |
| r12 = 33.245 | d12 = 9.85 | G7 | N7 = 1.61800 | v7 = 63.39 |
| r13 = −131.394 | d13 = 2.00 | | | |
| r14 = −116.242 | d14 = 2.50 | G8 | N8 = 1.74000 | v8 = 31.72 |
| r15 = 28.824 | d15 = 2.00 | | | |
| r16 = 27.762 | d16 = 4.76 | G9 | N9 = 1.78831 | v9 = 47.32 |
| r17 = 110.880 | d17 = 1.00 | | | |
| r18 = 24.041 | d18 = 2.00 | G10 | N10 = 1.74000 | v10 = 31.72 |
| r19 = 16.756 | d19 = 30.00 | | | |
| r20 = ∞ (Mirror M) | d20 = 13.00 | | | |
| r21 = ∞ (Stop S) | d21 = 4.50 | | | |
| r22 = 21.064 | d22 = 2.50 | G11 | N11 = 1.83350 | v11 = 21.00 |
| r23 = 30.406 | d23 = 5.68 | | | |
| r24 = 103.496 | d24 = 3.00 | G12 | N12 = 1.61800 | v12 = 63.39 |
| r25 = −21.355 | d25 = 1.50 | | | |
| r26 = −17.416 | d26 = 4.00 | G13 | N13 = 1.67339 | v13 = 29.25 |
| r27 = 23.035 | d27 = 2.00 | | | |

-continued

| | | | | |
|---|---|---|---|---|
| r28 = 17.575 | d28 = 6.00 | G14 | N14 = 1.48749 | ν14 = 70.44 |
| r29 = 17.480 | d29 = 1.91 | | | |
| r30 = 38.082 | d30 = 6.00 | G15 | N15 = 1.61800 | ν15 = 63.39 |
| r31 = −42.455 | d31 = 14.74 | | | |
| r32 = 18.131 | d32 = 6.00 | G16 | N16 = 1.83350 | ν16 = 21.00 |
| r33 = 15.603 | | | | |

EXAMPLE 2

| | |
|---|---|
| Object distance: | 60 mm |
| Effective F. No.: | 5.0 |
| Mirror oscillation angle: | ±6.1 degrees |

| [Radius of Curvature] | [Axial Distance] | [Lens] | [Refractive Index] | [Abbe Number] |
|---|---|---|---|---|
| r1 = −240.881 | d1 = 5.00 | G1 | N1 = 1.67339 | ν1 = 29.25 |
| r2 = 48.112 | d2 = 10.98 | G2 | N2 = 1.61800 | ν2 = 63.39 |
| r3 = −51.267 | d3 = 18.72 | | | |
| r4 = −34.071 | d4 = 5.00 | G3 | N3 = 1.67339 | ν3 = 29.25 |
| r5 = 49.737 | d5 = 1.71 | | | |
| r6 = 69.807 | d6 = 8.86 | G4 | N4 = 1.83350 | ν4 = 21.00 |
| r7 = −42.348 | d7 = 0.50 | | | |
| r8 = −52.992 | d8 = 2.00 | G5 | N5 = 1.67339 | ν5 = 29.25 |
| r9 = −97.001 | d9 = 0.50 | | | |
| r10 = 43.391 | d10 = 9.07 | G6 | N6 = 1.61800 | ν6 = 63.39 |
| r11 = −57.547 | d11 = 0.50 | | | |
| r12 = −69.091 | d12 = 2.00 | G7 | N7 = 1.74000 | ν7 = 31.72 |
| r13 = 175.888 | d13 = 0.50 | | | |
| r14 = 32.474 | d14 = 5.27 | G8 | N8 = 1.78831 | ν8 = 47.32 |
| r15 = −340.116 | d15 = 2.00 | G9 | N9 = 1.74000 | ν9 = 31.72 |
| r16 = 22.354 | d16 = 30.00 | | | |
| r17 = ∞ (Mirror M) | d17 = 13.00 | | | |
| r18 = ∞ (Stop S) | d18 = 4.50 | | | |
| r19 = 13.417 | d19 = 4.00 | G10 | N10 = 1.83350 | ν10 = 21.00 |
| r20 = 12.250 | d20 = 5.88 | | | |
| r21 = 15.255 | d21 = 3.00 | G11 | N11 = 1.61800 | ν11 = 63.39 |
| r22 = −103.932 | d22 = 1.50 | | | |
| r23 = −27.710 | d23 = 4.00 | G12 | N12 = 1.67339 | ν12 = 29.25 |
| r24 = 13.714 | d24 = 2.00 | | | |
| r25 = 16.057 | d25 = 6.00 | G13 | N13 = 1.48749 | ν13 = 70.44 |
| r26 = 21.020 | d26 = 1.00 | | | |
| r27 = 100.722 | d27 = 4.00 | G14 | N14 = 1.61800 | ν14 = 63.39 |
| r28 = −45.399 | d28 = 8.06 | | | |
| r29 = 26.041 | d29 = 6.00 | G15 | N15 = 1.83350 | ν15 = 21.00 |
| r30 = 36.220 | | | | |

EXAMPLE 3

| | |
|---|---|
| Object distance: | 60 mm |
| Effective F. No.: | 5.0 |
| Mirror oscillation angle: | ±6.1 degrees |

| [Radius of Curvature] | [Axial Distance] | [Lens] | [Refractive Index] | [Abbe Number] |
|---|---|---|---|---|
| r1 = −202.859 | d1 = 5.00 | G1 | N1 = 1.67339 | ν1 = 29.25 |
| r2 = 68.971 | d2 = 15.00 | G2 | N2 = 1.61800 | ν2 = 63.39 |
| r3 = −50.708 | d3 = 18.90 | | | |
| r4 = −38.535 | d4 = 5.00 | G3 | N3 = 1.67339 | ν3 = 29.25 |
| r5 = 43.944 | d5 = 16.65 | G4 | N4 = 1.83350 | ν4 = 21.00 |
| r6 = −67.607 | d6 = 0.57 | | | |
| r7 = −87.488 | d7 = 5.93 | G5 | N5 = 1.67339 | ν5 = 29.25 |
| r8 = −193.041 | d8 = 0.50 | | | |
| r9 = 57.498 | d9 = 10.80 | G6 | N6 = 1.61800 | ν6 = 63.39 |
| r10 = −43.765 | d10 = 2.00 | G7 | N7 = 1.74000 | ν7 = 31.72 |
| r11 = −473.216 | d11 = 0.50 | | | |
| r12 = 28.465 | d12 = 7.06 | G8 | N8 = 1.78831 | ν8 = 47.32 |
| r13 = 2190.149 | d13 = 2.13 | G9 | N9 = 1.74000 | ν9 = 31.72 |
| r14 = 19.784 | d14 = 30.00 | | | |

-continued

| | | | | |
|---|---|---|---|---|
| r15 = ∞ (Mirror M) | d15 = 13.00 | | | |
| r16 = ∞ (Stop S) | d16 = 4.50 | | | |
| r17 = 20.435 | d17 = 4.00 | G10 | N10 = 1.83350 | ν10 = 21.00 |
| r18 = 28.301 | d18 = 4.95 | | | |
| r19 = 23.548 | d19 = 3.45 | G11 | N11 = 1.61800 | ν11 = 63.39 |
| r20 = −36.096 | d20 = 1.50 | | | |
| r21 = −25.425 | d21 = 2.00 | G12 | N12 = 1.67339 | ν12 = 29.25 |
| r22 = 13.784 | d22 = 1.50 | | | |
| r23 = 14.186 | d23 = 6.00 | G13 | N13 = 1.48749 | ν13 = 70.44 |
| r24 = 15.802 | d24 = 10.90 | | | |
| r25 = 34.838 | d25 = 5.00 | G14 | N14 = 1.61800 | ν14 = 63.39 |
| r26 = −128.323 | d26 = 1.68 | | | |
| r27 = 23.872 | d27 = 6.00 | G15 | N15 = 1.83350 | ν15 = 21.00 |
| r28 = 21.263 | | | | |

EXAMPLE 4

| | | | | |
|---|---|---|---|---|
| Object distance: | 60 mm | | | |
| Effective F. No.: | 5.0 | | | |
| Mirror oscillation angle: | ±6.1 degrees | | | |

| [Radius of Curvature] | [Axial Distance] | [Lens] | [Refractive Index] | [Abbe Number] |
|---|---|---|---|---|
| r1 = −202.555 | d1 = 5.00 | G1 | N1 = 1.67339 | ν1 = 29.25 |
| r2 = 80.484 | d2 = 15.00 | G2 | N2 = 1.61800 | ν2 = 63.39 |
| r3 = −44.412 | d3 = 10.70 | | | |
| r4 = −34.397 | d4 = 5.00 | G3 | N3 = 1.74000 | ν3 = 31.72 |
| r5 = 47.267 | d5 = 20.00 | G4 | N4 = 1.83350 | ν4 = 21.00 |
| r6 = −111.845 | d6 = 0.95 | | | |
| r7 = 70.466 | d7 = 11.00 | G5 | N5 = 1.61800 | ν5 = 63.39 |
| r8 = −43.286 | d8 = 2.00 | G6 | N6 = 1.74000 | ν6 = 31.72 |
| r9 = −107.883 | d9 = 0.50 | | | |
| r10 = 30.328 | d10 = 9.00 | G7 | N7 = 1.78831 | ν7 = 47.32 |
| r11 = 759.423 | d11 = 2.00 | G8 | N8 = 1.74000 | ν8 = 31.72 |
| r12 = 20.24 | d12 = 30.00 | | | |
| r13 = ∞ (Mirror M) | d13 = 13.00 | | | |
| r14 = ∞ (Stop S) | d14 = 4.50 | | | |
| r15 = 19.553 | d15 = 4.00 | G9 | N9 = 1.83350 | ν9 = 21.00 |
| r16 = 25.954 | d16 = 3.49 | | | |
| r17 = 19.469 | d17 = 3.00 | G10 | N10 = 1.61800 | ν10 = 63.39 |
| r18 = −56.217 | d18 = 1.50 | | | |
| r19 = −35.333 | d19 = 2.67 | G11 | N11 = 1.67339 | ν11 = 29.25 |
| r20 = 11.612 | d20 = 1.50 | | | |
| r21 = 12.549 | d21 = 6.00 | G12 | N12 = 1.48749 | ν12 = 70.44 |
| r22 = 14.527 | d22 = 6.72 | | | |
| r23 = 39.772 | d23 = 3.00 | G13 | N13 = 1.61800 | ν13 = 63.39 |
| r24 = −180.197 | d24 = 6.47 | | | |
| r25 = 18.515 | d25 = 3.00 | G14 | N14 = 1.83350 | ν14 = 21.00 |
| r26 = 19.184 | | | | |

EXAMPLE 5

| | | | | |
|---|---|---|---|---|
| Object distance: | 60 mm | | | |
| Effective F. No.: | 5.0 | | | |
| Mirror oscillation angle: | ±6.1 degrees | | | |

| [Radius of Curvature] | [Axial Distance] | [Lens] | [Refractive Index] | [Abbe Number] |
|---|---|---|---|---|
| r1 = −4116.921 | d1 = 2.00 | G1 | N1 = 1.83350 | ν1 = 21.00 |
| r2 = 30.233 | d2 = 11.78 | G2 | N2 = 1.61800 | ν2 = 63.39 |
| r3 = −128.331 | d3 = 7.00 | | | |
| r4 = −37.813 | d4 = 5.00 | G3 | N3 = 1.74000 | ν3 = 31.72 |
| r5 = 90.115 | d5 = 12.14 | G4 | N4 = 1.83350 | ν4 = 21.00 |
| r6 = −54.53 | d6 = 0.50 | | | |
| r7 = 48.656 | d7 = 15.00 | G5 | N5 = 1.61800 | ν5 = 63.39 |
| r8 = −64.370 | d8 = 3.26 | G6 | N6 = 1.74000 | ν6 = 31.72 |
| r9 = −218.994 | d9 = 0.88 | | | |
| r10 = 25.751 | d10 = 8.00 | G7 | N7 = 1.83350 | ν7 = 21.00 |

-continued

| | | | | |
|---|---|---|---|---|
| r11 = 18.652 | d11 = 30.00 | | | |
| r12 = ∞ (Mirror M) | d12 = 13.00 | | | |
| r13 = ∞ (Stop S) | d13 = 4.50 | | | |
| r14 = 22.510 | d14 = 8.00 | G8 | N8 = 1.61800 | v8 = 63.39 |
| r15 = −44.563 | d15 = 2.61 | | | |
| r16 = −29.747 | d16 = 5.00 | G9 | N9 = 1.84666 | v9 = 23.82 |
| r17 = 23.336 | d17 = 12.33 | | | |
| r18 = 94.078 | d18 = 4.00 | G10 | N10 = 1.83350 | v10 = 21.00 |
| r19 = −36.841 | d19 = 12.75 | | | |
| r20 = 26.392 | d20 = 5.42 | G11 | N11 = 1.61800 | v11 = 63.39 |
| r21 = −32.560 | d21 = 0.60 | | | |
| r22 = −30.487 | d22 = 6.00 | G12 | N12 = 1.75000 | v12 = 25.14 |
| r23 = 23.340 | | | | |

FIGS. 11–15 are aberration diagrams corresponding to the optical systems of examples 1~5, respectively. In the spherical aberration diagrams, the solid line represents spherical aberration on the C-line, the small dash line represents spherical aberration on the d-line, the dash-dot line represents spherical aberration on the f-line, and the large dash line represents spherical aberration on the g-line. In the astigmatism diagrams, the small dash line S and the large dash line M respectively represent astigmatism on the sagittal plane and meridional plane at the d-line. The distortion diagrams show distortion on the d-line. Conditions (1)~(6) are satisfied in the optical systems of examples 1~5. Numerical values of conditions (1)~(6) in each example 1~5 are given below.

| | Ex. 1 | Ex. 2 | Ex. 3 | Ex. 4 | Ex. 5 |
|---|---|---|---|---|---|
| \|(Σvfp − Σvfm)/Lf\| | 9.55 | 4.88 | 4.88 | 14.90 | 2.33 |
| \|(Σvrp − Σvrm)/Lr\| | 35.00 | 35.00 | 35.00 | 35.00 | 16.47 |
| \|φf − 1/φf\| | 0.347 | 0.711 | 0.721 | 0.880 | 0.188 |
| Rf − 1r/Rf − 2f | 0.679 | 1.505 | 1.316 | 1.291 | 3.394 |
| Tf − 12 × φf | 0.275 | 0.224 | 0.227 | 0.128 | 0.084 |
| vrm | 29.25 | 29.25 | 29.25 | 29.25 | 23.82 |

Examples of public disclosure of the previously mentioned conventional art include values of conditions (1)~(6) listed below in the optical systems of examples 1~3 disclosed in Japanese Laid-Open Patent No. 9-236741. It will be understood that these values do not necessarily satisfy the conditional range.

| | Ex. 1 | Ex. 2 | Ex. 3 |
|---|---|---|---|
| \|(Σvfp − Σvfm)/Lf\| | 23.96 | 23.10 | 28.74 |
| \|(Σvrp − Σvrm)/Lr\| | 17.56 | 17.38 | 24.48 |
| \|φf − 1/φf\| | 0.583 | 0.988 | 1.320 |
| Rf − 1r/Rf − 2f | 1.111 | 1.633 | −1.340 |
| Tf − 12 × φf | −0.583 | 0.030 | 0.100 |
| vrm | 57.07 | 57.07 | 27.51 |

As described above, the present invention provides a high-performance scanning optical system at low cost, which specifically corrects magnification chromatic aberration and axial chromatic aberration without using a color separation prism, and is not susceptible to performance deterioration when scanning via a mirror.

The present invention specifically reduces chromatic aberration generated within an object side lens unit, and reduces axial chromatic aberration of the total optical system.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A scanning optical system for imaging an object, comprising:

an object side lens unit for receiving light having a plurality of color components from an object;

a mirror for performing a main scan by deflecting the light transmitted through the object side lens unit, the mirror having a reflecting surface including a rotational axis on the reflecting surface; and an image side lens unit for forming an image on an image sensing surface, said image sensing surface for receiving an image having a plurality of color components, using both the extra-axial light and axial light in a subscan direction deflected by the mirror;

wherein the following condition is satisfied:

$$0.1 < |(\Sigma vfp - \Sigma vfm)/Lf| < 15$$

where Σvfp represents the sum of the Abbe numbers of the positive optical power lenses within the object side lens unit, Σvfm represents the sum of the Abbe numbers of the negative optical power lenses within the object side lens unit, and Lf represents the number of lenses in the object side lens unit.

2. The scanning optical system according to claim 1, wherein the following condition is satisfied:

$$10.0 < |(\Sigma vrp - \Sigma vrm)/Lr| < 50.0$$

where Σvrp represents the sum of the Abbe numbers of the positive optical power lenses within the image side lens unit, Σvrp represents the sum of the Abbe numbers of the negative optical power lenses within the image side lens unit, and Lr represents the number of lenses in the image side lens unit.

3. The scanning optical system according to claim 1, wherein the object side lens unit includes a cemented lens comprising a negative lens element and a positive lens element.

4. The scanning optical system according to claim 3, wherein the cemented lens satisfies the following condition:

$$|(\phi f - 1)/\phi f| < 1.0$$

where φf−1 represents the optical power of the cemented lens within the object side lens unit, and φf represents the optical power of the object side lens unit.

5. The scanning optical system according to claim 1, wherein the object side lens unit comprises, sequentially from the object side, an object side front lens unit and an object side back lens unit arranged with a relatively large spacing therebetween.

6. The scanning optical system according to claim 5, wherein the outermost image side lens element within the object side front lens unit and the outermost object side lens element within the object side back lens unit satisfy the following condition:

$$0.4<(Rf-1r)/(Rf-2f)<5.0$$

where Rf–1r represents the radius of curvature of the image side surface of the outermost image side lens element within the object side front lens unit, and Rf–2f represents the radius of curvature of the object side surface of the outermost object side lens element within the object side back lens unit.

7. The scanning optical system according to claim 5, wherein the object side front lens unit satisfies the following condition:

$$0.05<(Tf-12)\times\phi f<0.4$$

where Tf–12 represents the distance between the object side front lens unit and the object side back lens unit, and $\phi f$ represents the optical power of the object side lens unit.

8. The scanning optical system according to claim 3, wherein the cemented lens is arranged at the outermost object side of the object side lens unit.

9. The scanning optical system according to claim 8, wherein the positive lens element of the cemented lens is arranged at the outermost object side of the object side lens unit.

10. The scanning optical system according to claim 1, wherein the following condition is satisfied:

$$vrm<35.0$$

where vrm represents the Abbe number of a negative lens in the image side lens unit.

* * * * *